(12) United States Patent
Hoffman

(10) Patent No.: US 6,553,363 B1
(45) Date of Patent: Apr. 22, 2003

(54) METHOD AND APPARATUS FOR PROCESSING DOCUMENTS IN A BROWSER

(75) Inventor: Richard Dale Hoffman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,636

(22) Filed: Mar. 31, 1999

(51) Int. Cl.⁷ .............................. G06F 7/00
(52) U.S. Cl. ........................... 707/1; 345/700
(58) Field of Search .................. 707/8, 9, 10, 101, 707/102, 104, 205, 100; 345/700, 744, 762, 761; 709/319–320, 328–329

(56) References Cited

U.S. PATENT DOCUMENTS

| | | | | |
|---|---|---|---|---|
| 5,065,347 A | * | 11/1991 | Pajak et al. .................. | 395/159 |
| 5,675,788 A | * | 10/1997 | Husick et al. ............... | 395/615 |
| 5,692,194 A | * | 11/1997 | Nguyen et al. .............. | 395/680 |
| 5,706,502 A | * | 1/1998 | Foley et al. ................. | 395/610 |
| 5,838,906 A | * | 11/1998 | Doyle et al. ............ | 395/200.32 |
| 5,877,766 A | * | 3/1999 | Bates et al. .................. | 345/357 |
| 5,948,064 A | * | 9/1999 | Bertram et al. ............. | 709/225 |
| 6,043,815 A | * | 3/2000 | Simonoff et al. ........... | 345/335 |
| 6,043,817 A | * | 3/2000 | Bolnick et al. ............. | 345/342 |
| 6,108,673 A | * | 8/2000 | Brandt et al. ............... | 707/505 |
| 6,115,709 A | * | 9/2000 | Gilmour et al. ............... | 707/9 |
| 6,141,659 A | * | 10/2000 | Barker et al. ............... | 707/102 |
| 6,272,493 B1 | * | 8/2001 | Pasquali ...................... | 707/10 |
| 6,313,854 B1 | * | 11/2001 | Gibson ........................ | 345/788 |
| 6,345,300 B1 | * | 2/2002 | Bakshi et al. ............... | 709/229 |
| 6,353,923 B1 | * | 3/2002 | Bogle et al. .................... | 717/4 |

* cited by examiner

Primary Examiner—James P. Trammell
Assistant Examiner—Mary Wang

(57) ABSTRACT

A method and apparatus in a computer for processing a document retrieved from a server connected to the computer by a communications link. A document is retrieved from the server over the communications link. The document is parsed. A determination is made as to whether a command to open a window is present within the document. The window is opened selectively based on a setting.

27 Claims, 5 Drawing Sheets

Advanced      Change preferences that affect the entire product

502 — ☑ Automatically load images
504 — ☑ Enable Java
506 — ☑ Enable JavaScript
508 — ☑ Enable JavaScript to Create New Windows
    510 — ☐ Confirm before opening

```
window.open (...) {
if(!preferences.allow_windows) return;
if(preferences.confirm_windows) {
if(!confirm) return;
}
// continue with normal processing for new window
}
```

1000

```
<HTML>
<HEAD>                                              900
<SCRIPT LANGUAGE="JavaScript1.2">
<!--Hide script from old browsers.          902
    ┌─────────────────────────────────────────┐
    │ document.write ("Hello")   904          │
    │ exampleWin=window.open("http:/ibm.com","IBM Homepage") │
    └─────────────────────────────────────────┘
//End the hiding here.-->
</SCRIPT>
</HEAD>
<BODY>
<P>Good bye
</BODY>
</HTML>
```

METHOD AND APPARATUS FOR PROCESSING DOCUMENTS IN A BROWSER

BACKGROUND OF THE INVENTION

1. Technical Field

The present invention relates generally to an improved data processing system and in particular to a method and apparatus for processing documents in a browser. Still more particularly, the present invention provides a method and apparatus for selectively enabling or disabling opening of windows while processing a document.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser, which retrieves a web page, also referred to as a document. The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Users exploring the Web have discovered that the content on web pages supported by HTML document format on the Web was too limited. Users desire an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Java™ is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

JavaScript is a cross-platform, object-oriented scripting language by Netscape Communications Corporation. JavaScript allows for the creation of applications that run over the Internet. With JavaScript, client applications may be run in a browser, such as Netscape Navigator, and server applications run on a server, such as Netscape Enterprise Server, both products being available from Netscape Communications Corporation. Using JavaScript, dynamic HTML pages may be created in which the pages process user input and maintain persistent data using special objects, files, and relational databases.

A web page as used herein is a set of instructions for creating a display using a browser. These instructions for web pages may be from pre-existing files or automatically generated by another program. A web page or document may contain both HTML statements and JavaScript statements. Web browsers can interpret client-side JavaScript statements embedded in an HTML page. When the browser on a client requests a web page, the server sends the full content of the document, including HTML and JavaScript statements, to the client. The browser reads the web page from top to bottom, displaying the results of the HTML and executing JavaScript statements as they are encountered in the document.

JavaScript may be used to create or open a new window in addition to the main window in which a document is being presented. With the use of JavaScript, web pages may be processed, causing new windows to be opened without the consent or sometimes even the knowledge of the user. Some pages use these new windows as "stealth panels", from which advertising may be controlled and which would serve to keep other panels alive even when they have been closed. The use of this feature can cause navigation confusion because each new window has its own history mechanism, and it is usually not obvious when a new window has been opened.

With respect to this problem, state of the art browsers offer a user a choice to enable or disable the use of JavaScript in web pages. Since many web-based applications now require the use of JavaScript, disablement of JavaScript poses a serious inconvenience.

Therefore, it would be advantageous to have an improved method and apparatus for processing web pages to prevent unauthorized opening of windows.

SUMMARY OF THE INVENTION

The present invention provides a method and apparatus in a computer for processing a document retrieved from a server connected to the computer by a communications link. A document is retrieved from the server over the communications link. The document is parsed. A determination is made as to whether a command to open a window is present within the document. The window is opened selectively based on a setting.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
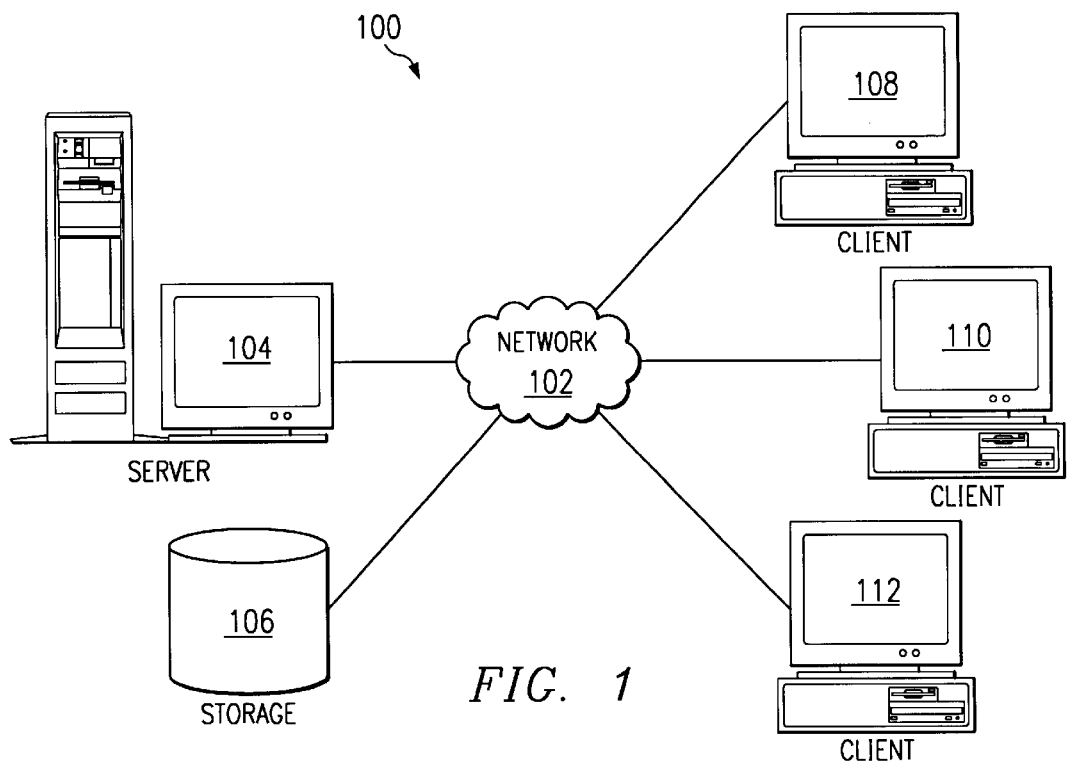
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. In particular, clients 108–112 may contain browser programs that are used to explore network 102 and retrieve various documents and resources from data processing systems, such as server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
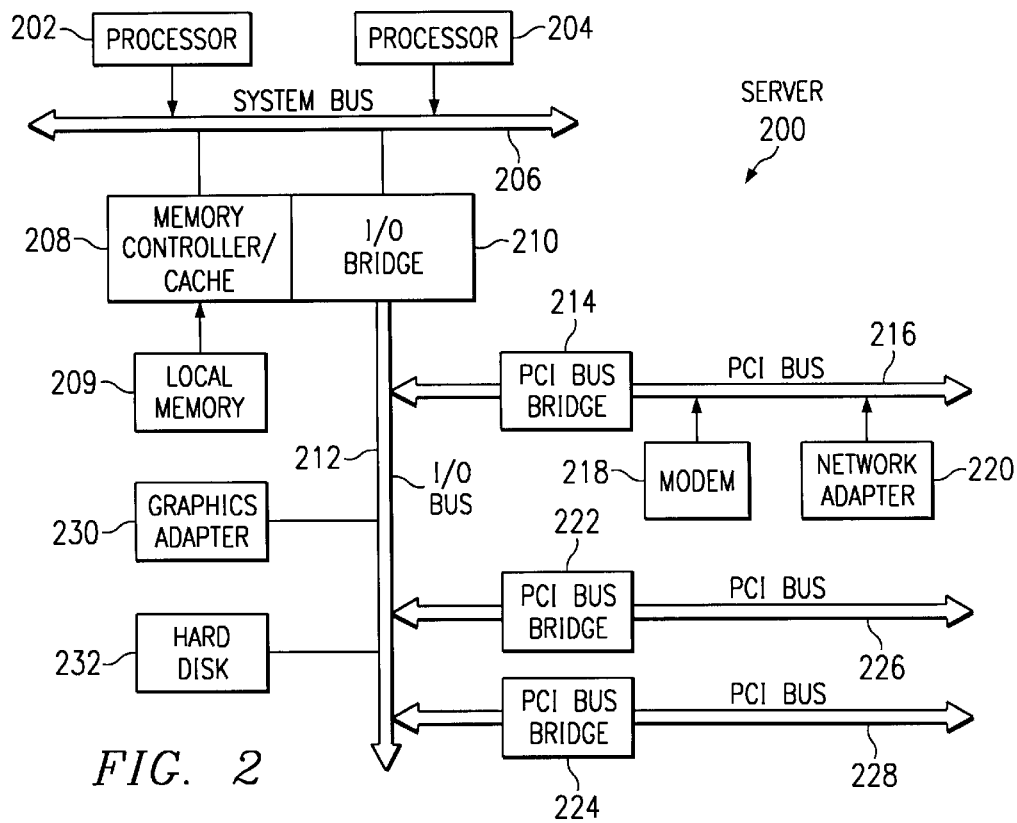
FIG. 2 is a block diagram depicting a data processing system, which may be implemented as a server, in accordance with a preferred embodiment of the present invention.

Referring to FIG. 2, a block diagram depicts a data processing system, which may be implemented as a server, such as server 104 in FIG. 1, in accordance with a preferred embodiment of the present invention. Data processing system 200 may serve as a place for web sites that are accessed by various clients.

Data processing system 200 may be a symmetric multi-processor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
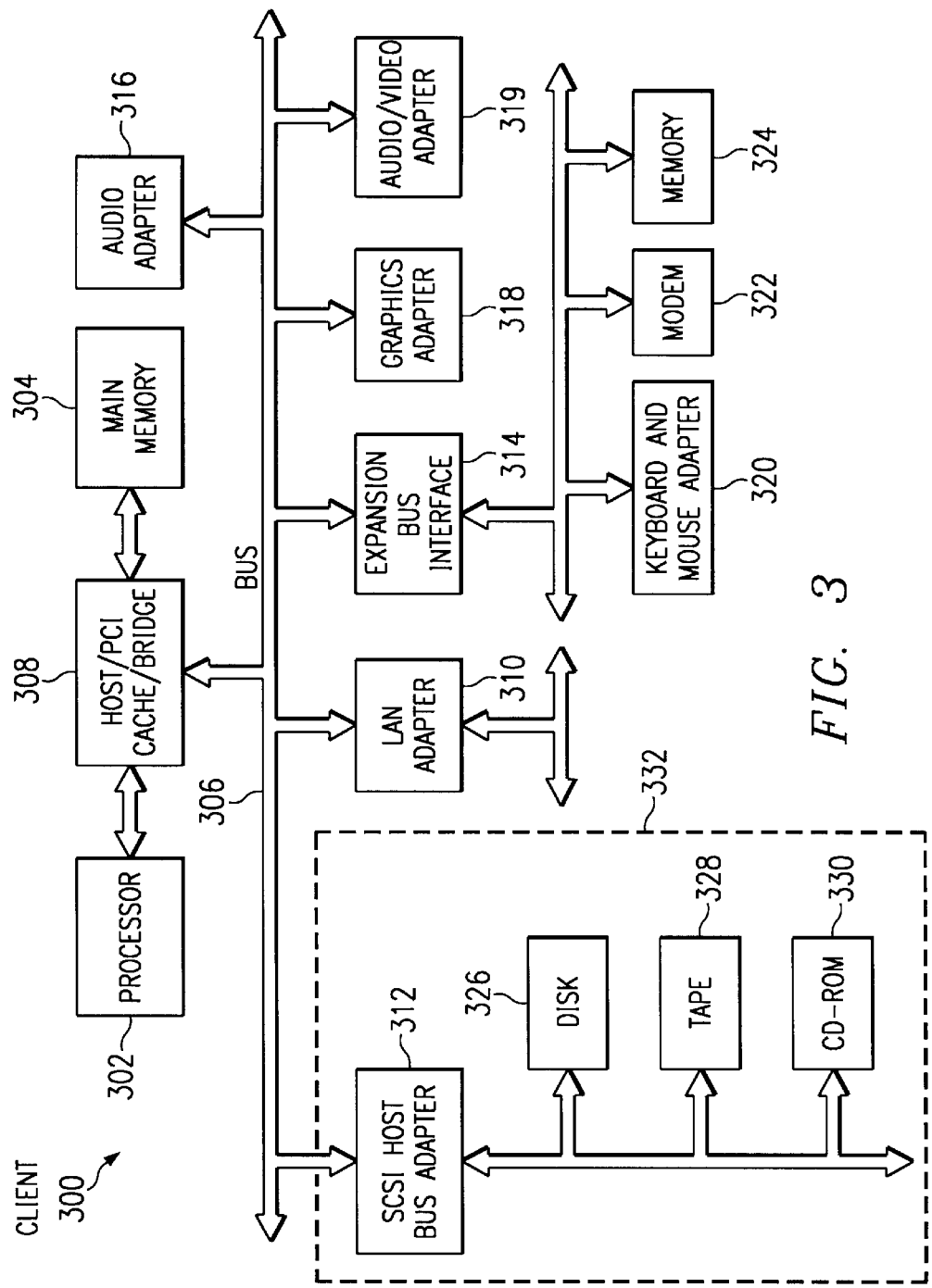
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. A user may through a browser program use data processing system 300 to retrieve various documents and resources from the Internet.

Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

Figures 4, 5, 10:
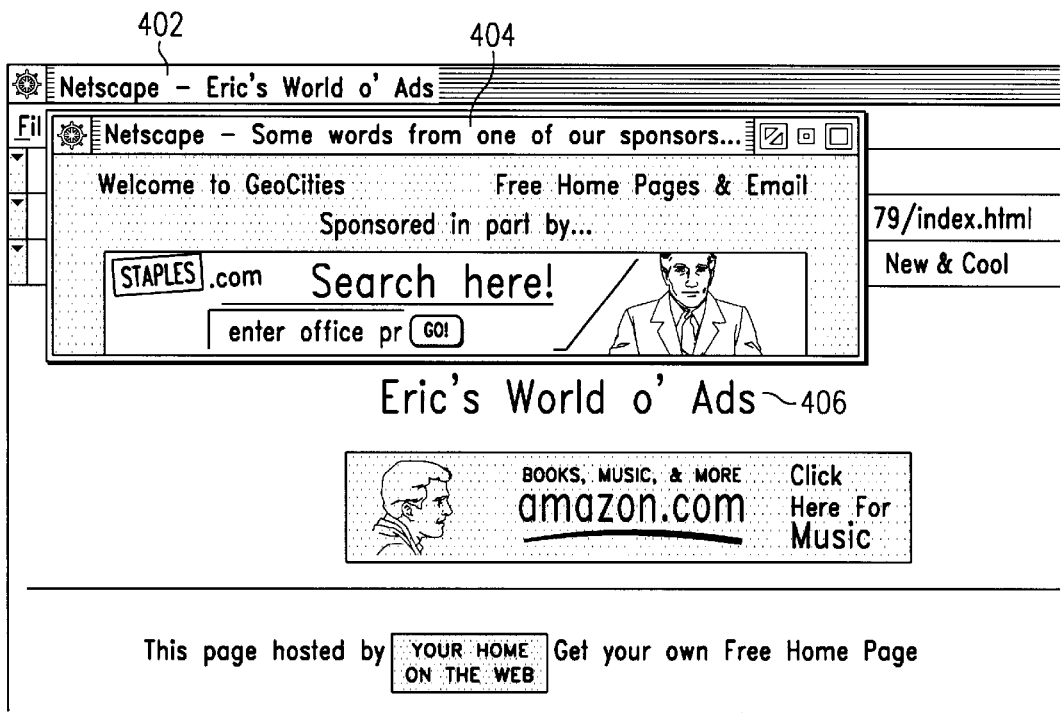
FIG. 4 is an illustration of a secondary window created by a JavaScript statement.
FIG. 5 is an illustration of a preferences dialog in accordance with a preferred embodiment of the present invention.
FIG. 10 is pseudo code used to process a document in accordance with a preferred embodiment of the present invention.

With reference now to FIG. 4, an illustration of a secondary window created by a JavaScript statement is shown. Display 400 illustrates a browser window 402 for a web page. Superimposed on window 402 is a second window 404. Window 404 is not invoked by the user, but is opened when a user selects an object, such as advertisement 406 in window 402. Window 404 is an unwanted window containing advertising content that the user did not want to see. In the present case, a user may exit window 404, but in some cases it is possible to construct the window in a manner that makes the window persist or reappear. This problem can be avoided by disabling JavaScript, but many other pages will not work properly with such a selection.

To solve this problem, the present invention provides a method, apparatus, and instructions that allow a user to selectively disable or enable the opening or creation of new windows when a document, such as an HTML document is processed. The mechanism of the present invention monitors or searches for the use of a statement that opens or creates a new window when a document is being processed for display by a browser. When such a statement is detected, a determination is made as to whether the statement should be processed. This determination may be made in a number of ways. For example, parameters or preferences set by the user may be examined to see whether creation of a new window from a statement is to be allowed. Alternatively, the user may be prompted for a confirmation as to whether the new window should be created. In the depicted examples, a browser is a program that is used to search for and retrieve documents from a network, such as the Internet. An example of a browser is Netscape Navigator, which is available from Netscape Communications Corporation. Of course, a browser may be integrated with another program, such as a word processor or spreadsheet program.

With reference now to FIG. 5, an illustration of a preferences dialog is depicted in accordance with a preferred embodiment of the present invention. Preferences dialog 500 in this example, is a dialog that is present to a user to select preferences for use with a browser. In particular, dialog 500 allows for a user to set a preference as to whether images should be automatically loaded by selecting or not selecting box 502 in dialog 500. By selecting box 504, a user may enable the use of Java for the browser. Selection of box 506 enables the use of JavaScript. Absent such a selection, JavaScript statements will not be executed when encountered in a web page. Selection of box 508 allows JavaScript to create new windows when such a statement is encountered. Selection of box 510 would cause a graphical prompt to have the user confirm before opening a new window.

Figure 6:
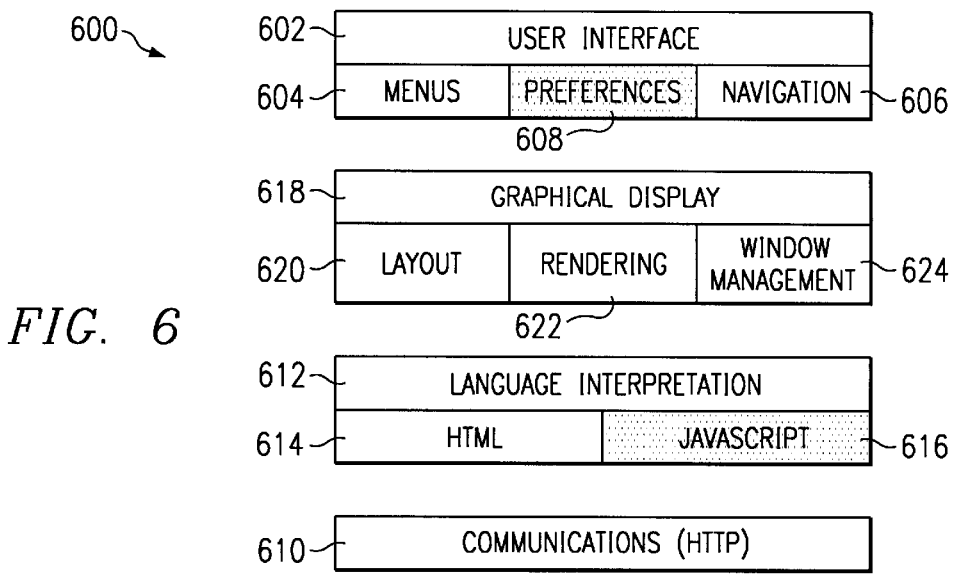
FIG. 6 is a block diagram of a browser program in accordance with a preferred embodiment of the present invention.

Turning next to FIG. 6, a block diagram of a browser program is depicted in accordance with a preferred embodiment of the present invention. Browser 600 includes a user interface 602, which is a graphical user interface (GUI) that allows the user to interface or communicate with browser 600. This interface provides for selection of various functions through menus 604 and allows for navigation through navigation 606. For example, menu 604 may allow a user to perform various functions, such as saving a file, opening a new window, displaying a history, and entering a URL. Navigation 606 allows for a user to navigate various pages and to select web sites for viewing. For example, navigation 606 may allow a user to see a previous page or a subsequent page relative to the present page. Preferences such as those illustrated in FIG. 5 may be set through preferences 608.

Communications 610 is the mechanism with which browser 600 receives documents and other resources from a network such as the Internet. Further, communications 610 is used to send or upload documents and resources onto a network. In the depicted example, communication 610 uses HTTP. Documents that are received by browser 600 are processed by language interpretation 612, which includes an HTML unit 614 and a JavaScript unit 616. Language interpretation 612 will process a document for presentation on graphical display 618. In particular, HTML statements are processed by HTML unit 614 for presentation while JavaScript statements are processed by JavaScript unit 616. The processes of the present inventions may be embodied within JavaScript unit 616 in language interpretation 612.

Graphical display 618 includes layout unit 620, rendering unit 622, and window management 624. These units are involved in presenting web pages to a user based on results from language interpretation 612.

Browser 600 is presented as an example of a browser program in which the present invention may be embodied. Browser 600 is not meant to imply architectural limitations to the present invention. Presently available browsers may include additional functions not shown or may omit functions shown in browser 600.

Figure 7:
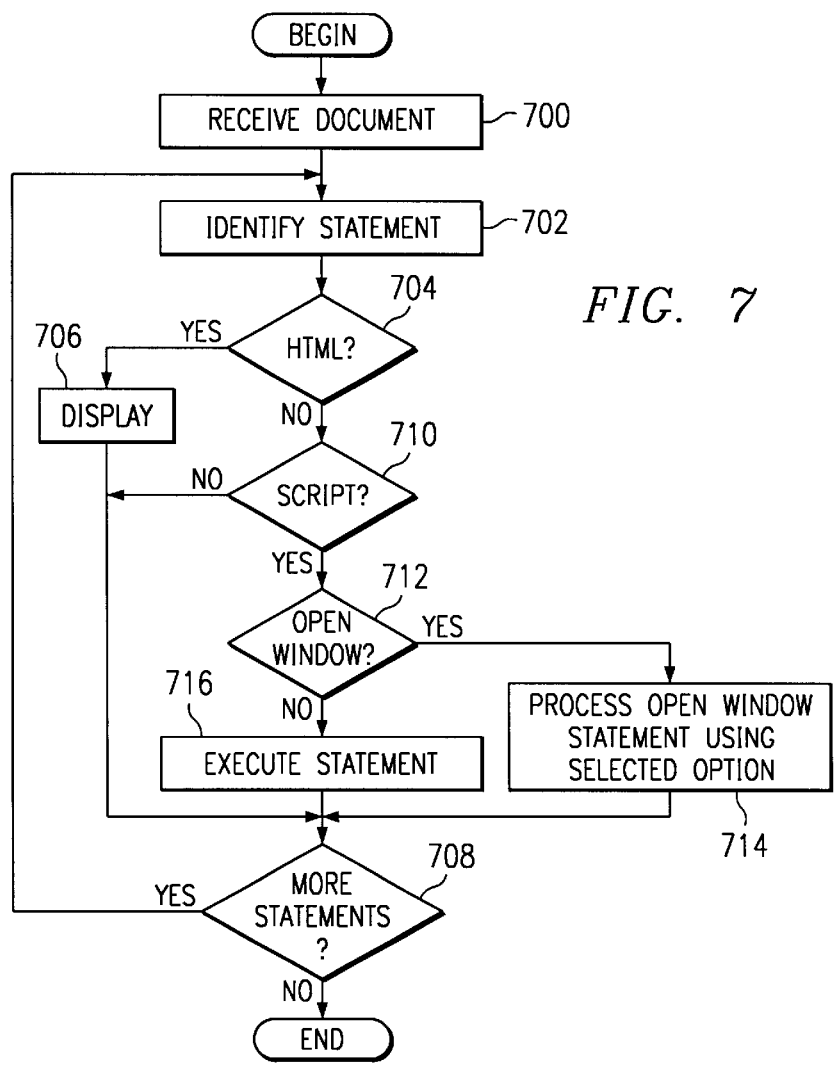
FIG. 7 is a flowchart of a process used by a browser to process a document in accordance with a preferred embodiment of the present invention.

With reference now to FIG. 7, a flowchart of a process used by a browser to process a document is depicted in accordance with a preferred embodiment of the present invention. The process begins by receiving a document from a source, such a,s a web server (step 700). The process then proceeds to identify a statement in the document for processing (step 702). Typically, in an HTML document, the statements are processed from top to bottom. A determination is then made as to whether the statement is an HTML statement (step 704). If the statement is an HTML statement, the process then will display the appropriate text or object based on the statement (step 706). A determination is then made as to whether additional statements are present in the document for processing (step 708). If additional statements are absent from the document, the process terminates. Otherwise, the process returns to step 702 to select the next statement for processing, as described above.

With reference again to step 704, if the statement is not an HTML statement, the process then determines whether the statement is a JavaScript statement (step 710). If the statement is a JavaScript statement, a determination is then made as to whether the statement is an open window statement (step 712). If the statement is an open window statement, the statement is processed using the user selected option (step 714) with the process then proceeding to step 708 as described previously.

With reference again to step 712, if the JavaScript statement is not an open window statement, the statement is executed (step 716) with the process then proceeding to step 708. Most browser will ignore unknown statements. Thus, turning again to step 710, if the statement is not a script statement, the process continues to step 708 to see if additional statements are present for processing.

Figures 8, 9:
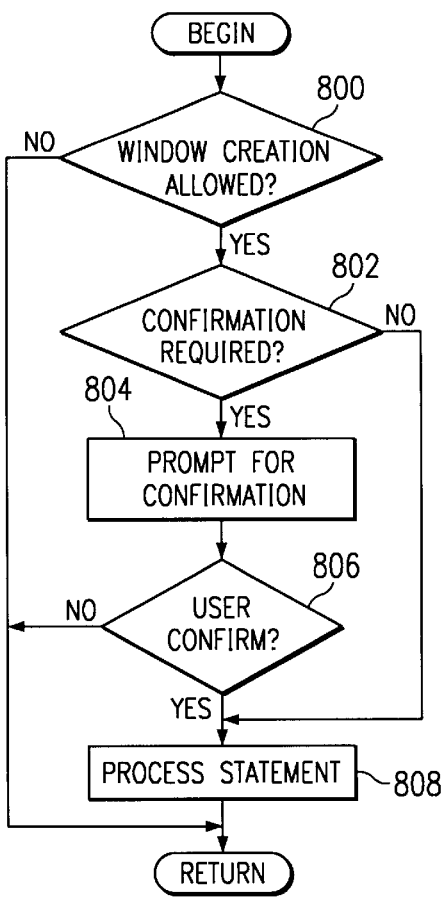
FIG. 8 is a flowchart of a process used in a browser to process open window statements in accordance with a preferred embodiment of the present invention.
FIG. 9 is an example of a document containing an open window statement that is processed by the present invention in accordance with a preferred embodiment of the present invention.

With reference next to FIG. 8, a flowchart of a process used in a browser to process open window statements is depicted in accordance with a preferred embodiment of the present invention. The flowchart in FIG. 8 is a more detailed example of the process performed in step 714 in FIG. 7 when an open window statement is encountered while processing a document.

The process begins by determining whether window creation is allowed (step 800). This determination may be made by identifying the preference set by the user. This preference may be set through a dialog such as dialog 500 in FIG. 5. If window creation is allowed, the process then determines whether confirmation is required (step 802). If confirmation is required, the user is prompted for a confirmation to allow opening or creation of the new window (step 804). This prompt may be in the form of a dialog being displayed by the graphical user interface with a first button that the user may select if opening of the window is to be allowed and a second button for selection if opening of the window is to be disallowed. A determination is then made as to whether the user confirms to allow opening of the new window (step 806). If the user allows opening of the window, the open window statement is then processed (step 808) with the process then returning.

With reference again to step 806, if the user does not confirm opening of the window, the process returns without processing or executing the open window statement. The same result occurs if window creation is not allowed in the determination in step 800.

With reference again to step 802, if confirmation is not required, the process proceeds to step 808 as discussed above.

Turning next to FIG. 9, an example of a document containing an open window statement that is processed by the present invention is depicted in accordance with a preferred embodiment of the present invention. Document 900 is an example an HTML document that contains both HTML statements and JavaScript statements. The JavaScript statements are found in section 902 in which statement 904 is an open window statement. The processes of the present invention as illustrated in FIGS. 7 and 8 will process statements from this document and selectively enable and disable opening of a window when statement 904 is encountered.

With reference now to FIG. 10, pseudo code used to process a document is depicted in accordance with a preferred embodiment of the present invention. Pseudo code 1000 illustrates code that is used to process an open window statement and may be added to currently available functions used to process JavaScript statements.

Thus, the present invention allows a user to selectively enable and disable opening or creation of new windows while viewing a web page. The mechanism of the present invention allows a user to set through preferences an indication of whether an open window statement should be allowed to execute. This preference along with indicating whether JavaScript should be allowed to execute provides granularity in controlling the use of JavaScript in a browser. Although the depicted examples are directed towards open window statements in the form of "window.open" in JavaScript, the processes of the present invention may be applied to other types of statements in other languages. For example, the present invention is not limited to merely processing open windows statements, but may be applied to other statements, that would open a window or result in a window being opened, e.g., a window opening subroutine. Further, the present invention may be applied to other scripting languages that include these types of statements.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer for processing a document retrieved from a server connected to the computer by a communications link, the method comprising the data processing system implemented steps of:

prior to retrieving documents from the server, storing a setting in the computer, the setting being used when any document is received for display;

retrieving a document from the server over the communications link;

parsing the document;

determining whether a command to open a window is present within the document;

determining whether the setting indicates that new windows may be opened during the display of the document, wherein new windows are prohibited from being opened during the display of the document in response to the setting indicating that new windows may not be opened during the display of the document even though a command to open a window may be present within a document;

in response to a determination that the setting indicates that new windows may be opened during the display of the document, selectively opening the window based on a second setting associated with the command.

2. The method of claim 1, wherein the setting prevents processing of the command.

3. The method of claim 1, wherein the setting initiates a prompt to a user to select whether to allow the window to be opened.

4. The method of claim 1, wherein the command is a JavaScript statement.

5. The method of claim 1, wherein the document is a web page.

6. A method in a computer for processing a web page, the method comprising the computer implemented steps of:

receiving, within a browser, the web page;

processing, by the browser, the web page for display;

prior to displaying the web page in a first window, determining, by the browser, whether an instruction to open a second window is present in the web page;

responsive to a presence of an instruction to open a second window, prior to displaying the web page in the first window, determining, utilizing the browser, whether a setting indicates that new windows may be created during the display of the web page, wherein new windows are prohibited from being created during the display of the web page in response to the setting indicating that new windows may not be created during the display of the web page even though an instruction to open a second window is present within a web page;

responsive to a determination by the browser that the setting indicates that new windows may be created, creating the second window; and responsive to a determination by the browser that the setting indicates that new windows may not be created, prohibiting creation of the second window.

7. The method of claim 6, further comprising the steps of:

determining, by the browser, whether a confirmation is required; and responsive to a determination the confirmation is required, generating a prompt to confirm creation of the window.

8. A method in a browser used in a computer for processing HTML web pages, the method comprising:

prior to receiving a web page for display in a web page window, prompting, utilizing the browser, a user to enter a preference of whether or not new windows may be created while web pages are displayed by the browser in web page windows;

storing the preference within the browser;

wherein the preference is used for any web page that is received by the browser for display;

receiving the web page for display by the browser;

processing the web page utilizing the browser for display within the web page window;

prior to displaying the web page, determining utilizing the browser, whether an instruction to create a new window is present in the web page;

in response to a determination that the web page includes the instruction, determining whether the preference indicates that new windows may be created during a display of the web page in the web page window, in response to a determination that the preference indicates that new windows may be created during a display of the web page in the web page window, creating the new window while the web page is displayed; and in response to a determination that the preference indicates that new windows may not be created during a display of the web page in the web page window, prohibiting a creation of the new window even though an instruction to create a new window is present within a web page.

9. The method of claim 8 further comprising:

prior to receiving a web page for display in a web page window, presenting, utilizing the browser, options for handling window creation;

receiving a selection of an option for handling window creation; and storing the selection as the preference in the browser.

10. The method of claim 8, further comprising the steps of:

prompting, utilizing the browser, a user to enter a confirmation preference of whether or not a confirmation is required prior to creating new windows;

storing the confirmation preference with the preference in the browser;

in response to a confirmation being required, prompting a user to enter a confirmation prior to creating a new window; and in response to a receipt of the confirmation, creating the new window.

11. The method of claim 8, further comprising the steps of:

prior to displaying the web page, searching, utilizing the browser, the HTML web page for a JAVA script OPEN WINDOW statement; and wherein the instruction is the JAVA script OPEN WNDOW statement.

12. The method according to claim 11, further comprising the steps of:

wherein the step of determining whether the preference indicates that new windows may not be created during a display of the web page in the web page window further includes the step of determining, by the browser utilizing the preference, whether the JAVA script OPEN WINDOW statement should be processed;

in response to a determination that the JAVA script OPEN WINDOW statement should be processed, processing, by the browser, the JAVA script OPEN WNDOW; and in response to a determination that the JAVA script OPEN WINDOW statement should not be processed, ignoring, by the browser, the JAVA script OPEN WINDOW.

13. A data processing system for processing a document retrieved from a server connected to the computer by a communications link, the data processing system comprising:

storing means for storing a setting in the computer prior to retrieving documents from the server, the setting being used when any document is received for display;

retrieving means for retrieving a document from the server over the communications link;

parsing means for parsing the document;

determination means for determining whether a command to open a window is present within the document;

determining means for determining whether said setting indicates that new windows may be opened during the display of the document, wherein new windows are prohibited from being opened during the display of the document in response to the setting indicating that new windows may not be opened during the display of the document even though a command to open a window may be present within a document;

in response to a determination that the setting indicates that new windows may be opened during the display of the document, opening means for selectively opening the window based on a second setting associated with the command.

14. The data processing system of claim 13, wherein the setting prevents processing of the command.

15. The data processing system of claim 13, wherein the setting initiates a prompt to a user to select whether to allow the window to be opened.

16. The data processing system of claim 13, wherein the command is a JavaScript statement.

17. The data processing system of claim 13, wherein the document is a web page.

18. A data processing system for processing a web page, the data processing system comprising:

a browser for receiving the web page;

the browser for processing the web page for display;

the browser for determining, prior to displaying the web page in a first window, whether an instruction to open a second window is present in the web page;

the browser, responsive to a presence of an instruction to open a second window, for determining whether a setting indicates that new windows may be created during the display of the web page, wherein new windows are prohibited from being created during the display of the web page in response to the setting indicating that new windows may not be created during the display of the web page;

the browser, responsive to a determination that the setting indicates that new windows may be created, for creating the second window; and the browser, responsive to a determination that the setting indicates that new windows may not be created, prohibiting creation of the second window even though an instruction to open a second window is present within a web page.

19. The data processing system of claim 18, further comprising:

the browser for determining whether a confirmation is required; and generating means, responsive to a determination that the confirmation is required, for generating a prompt to confirm creation of the window.

20. A data processing system in a browser used in a computer for processing HTML web pages, the data processing system comprising:

the browser for prompting a user, prior to receiving a web page for display in a web page window, to enter a preference of whether or not new windows may be created while web pages are displayed by the browser in web page windows;

the preference being stored in the browser;

the preference being used for any web page that is received by the browser for display;

receiving means for receiving the web page for display by the browser;

processing means for processing the web page utilizing the browser for display within the web page window;

the browser for determining, prior to displaying the web page, whether an instruction to create a new window is present in the web page;

in response to a determination that the web page includes the instruction, the browser, prior to displaying the web page, for determining whether the preference indicates that new windows may be created during a display of the web page in the web page window;

in response to a determination that the preference indicates that new windows may be created during a display of the web page in the web page window, the browser for creating the new window; and in response to a determination that the preference indicates that new windows may not be created during a display of the web page in the web page window, the browser for prohibiting a creation of the new window even though an instruction to open a new window is present within a web page.

21. The data processing system of claim 20 further comprising:

the browser for, prior to receiving a web page for display in a web page window, presenting options for handling window creation;

receiving means for receiving a selection of an option for handling window creation; and storing means for storing the selection as the preference in the browser.

22. The data processing system of claim 20, further comprising:

the browser for prompting a user to enter a confirmation preference of whether or not a confirmation is required prior to creating new windows;

the confirmation preference being stored in the browser;

the browser, in response to a confirmation being required, for prompting a user to enter a confirmation prior to creating a new window; and the browser for creating the new window, in response to a receipt of the confirmation.

23. The data processing system of claim 20, further comprising:

the browser for searching the HTML web page for a JAVA script OPEN WINDOW statement prior to displaying the web page; and wherein the instruction is the JAVA script OPEN WINDOW statement.

24. The system according to claim 23, further comprising:

the browser for determining, utilizing the preference, whether the JAVA script OPEN WINDOW statement should be processed;

in response to a determination that the JAVA script OPEN WINDOW statement should be processed, the browser for processing the JAVA script OPEN WINDOW; and in response to a determination that the JAVA script OPEN WINDOW statement should not be processed, the browser for ignoring the JAVA script OPEN WINDOW.

25. A computer program product in a computer readable medium for processing a document retrieved from a server connected to the computer by a communications link, the computer program product comprising:

instructions, prior to retrieving documents from the server, for storing a setting in the computer, the setting being used when any document is received for display;

instructions for retrieving a document from the server over the communications link;

instructions for parsing the document;

instructions for determining whether a command to open a window is present within the document;

instructions for determining whether said setting indicates that new windows may be opened during the display of the document, wherein new windows are prohibited from being opened during the display of the document in response to the setting indicating that new windows may not be opened during the display of the document even though a command to open a window may be present within a document;

in response to a determination that the setting indicates that new windows may be opened during the display of the document, instructions for selectively opening the window based on a second setting associated with the command.

26. A computer program product in a computer readable medium for processing a web page, the computer program product comprising:

instructions for receiving the web page within a browser;

instructions for processing the web page for display within the browser;

instructions for, prior to displaying the web page in a first window, determining, by the browser, whether an instruction to open a second window is present in the web page;

instructions, responsive to a presence of an instruction to open a second window, for determining, utilizing the browser, whether a setting indicates that new windows may be created during the display of the web page, wherein new windows are prohibited from being created during the display of the web page in response to the setting indicating that new windows may not be created during the display of the web page;

instructions, responsive to a determination, by the browser, that the setting indicates that new windows may be created, for creating the second window; and instructions, responsive to a determination by the browser that the setting indicates that new windows may not be created, for prohibiting creation of the second window even though an instruction to open a second window is present within a web page.

27. A computer program product in a computer readable medium in a browser used in a computer for processing HTML web pages, the computer program product comprising: instructions, prior to receiving a web page for display in a web page window, for prompting, utilizing the browser, a user to enter a preference of whether or not new windows may be created while web pages are displayed by the browser in web page windows;

instructions for storing the preference within the browser;

wherein the preference is used for any web page that is received by the browser for display;

instructions for receiving the web page for display by the browser;

instructions for processing the web page utilizing the browser for display within the web page window;

instructions, prior to displaying the web page, for determining utilizing the browser, whether an instruction to create a new window is present in the web page;

in response to a determination that the web page includes the instruction, instructions for determining whether the preference indicates that new windows may be created during a display of the web page in the web page window;

in response to a determination that the preference indicates that new windows may be created during a display of the web page in the web page window, instructions for creating the new window; and in response to a determination that the preference indicates that new windows may not be created during a display of the web page in the web page window, instructions for prohibiting a creation of the new window.

\* \* \* \* \*

UNITED STATES PATENT AND TRADEMARK OFFICE
CERTIFICATE OF CORRECTION

PATENT NO. : 6,553,363 B1
DATED : April 22, 2003
INVENTOR(S) : Hoffman

It is certified that error appears in the above-identified patent and that said Letters Patent is hereby corrected as shown below:

<u>Title page,</u>
Insert item -- [74] *Attorney, Agent, or Firm* – Duke W. Yee; David A. Mims, Jr.; Lisa L. B. Yociss --

Signed and Sealed this

Second Day of December, 2003

JAMES E. ROGAN
*Director of the United States Patent and Trademark Office*